(12) United States Patent
Witteveen

(10) Patent No.: US 11,102,991 B2
(45) Date of Patent: *Aug. 31, 2021

(54) ENCAPSULATION

(71) Applicant: GIVAUDAN SA, Vernier (CH)

(72) Inventor: Frans Witteveen, CM Leusden (NL)

(73) Assignee: Givaudan SA, Vernier (CH)

( * ) Notice: Subject to any disclaimer, the term of this patent is extended or adjusted under 35 U.S.C. 154(b) by 482 days.

This patent is subject to a terminal disclaimer.

(21) Appl. No.: 15/025,684

(22) PCT Filed: Oct. 29, 2014

(86) PCT No.: PCT/EP2014/073186
§ 371 (c)(1),
(2) Date: Mar. 29, 2016

(87) PCT Pub. No.: WO2015/063130
PCT Pub. Date: May 7, 2015

(65) Prior Publication Data
US 2016/0242441 A1     Aug. 25, 2016

(30) Foreign Application Priority Data
Oct. 30, 2013  (GB) ..................................... 1319192

(51) Int. Cl.
| A23L 27/00 | (2016.01) |
| A23G 4/10 | (2006.01) |
| A23L 29/244 | (2016.01) |
| A23L 27/30 | (2016.01) |
| A23L 29/269 | (2016.01) |
| A23L 29/212 | (2016.01) |

(52) U.S. Cl.
CPC ................ *A23G 4/10* (2013.01); *A23L 27/31* (2016.08); *A23L 27/32* (2016.08); *A23L 27/34* (2016.08); *A23L 27/72* (2016.08); *A23L 27/80* (2016.08); *A23L 29/212* (2016.08); *A23L 29/244* (2016.08); *A23L 29/27* (2016.08); *A23V 2002/00* (2013.01)

(58) Field of Classification Search
USPC ......................................................... 426/89
See application file for complete search history.

(56) References Cited

U.S. PATENT DOCUMENTS

| 4,143,163 A | 3/1979 | Hutchison et al. |
| 4,288,460 A * | 9/1981 | Ciliberto ................ A23L 2/395 252/382 |
| 5,624,612 A | 4/1997 | Sewall et al. |
| 5,718,969 A | 2/1998 | Sewall et al. |
| 2006/0110494 A1 | 5/2006 | Dusterhoft et al. |
| 2011/0020522 A1 | 1/2011 | Emoto |
| 2011/0027412 A1 | 2/2011 | Spence et al. |
| 2011/0165313 A1 | 7/2011 | Ivie et al. |
| 2011/0244083 A1 | 10/2011 | Chen et al. |
| 2012/0141652 A1 | 6/2012 | Watanabe et al. |
| 2015/0064313 A1 | 3/2015 | Witteveen |
| 2015/0230507 A1 | 8/2015 | Witteveen |

FOREIGN PATENT DOCUMENTS

| CN | 1864540 A | 11/2006 |
| WO | WO 2013/156591 A1 | 10/2013 |
| WO | WO 2013/176974 A1 | 11/2013 |

OTHER PUBLICATIONS

PCT/EP2014/073186—International Search Report, dated Feb. 10, 2015.
PCT/EP2014/073186—International Written Opinion, dated Feb. 10, 2015.
GB1319192.9—Great Britain Search Report, dated Apr. 22, 2014.
PCT/EP2014/073186—International Preliminary Report on Patentability, dated May 3, 2016.
Office Action; dated Aug. 10, 2016, for U.S. Appl. No. 14/699,047.
Final Office Action; dated Jun. 8, 2017, for U.S. Appl. No. 14/699,047.
Office Action; dated Sep. 7, 2017 for U.S. Appl. No. 14/699,047.
Office Action dated Mar. 20, 2018, for U.S. Appl. No. 14/699,047.

* cited by examiner

*Primary Examiner* — Lien T Tran
(74) *Attorney, Agent, or Firm* — Curatolo Sidoti Co., LPA; Salvatore A Sidoti; Floyd Trillis, III

(57) ABSTRACT

An encapsulated flavour, comprising a core material, flavour material and a coating material, the core material comprising a finely-divided native starch, xanthan gum and konjac. The encapsulated flavours may be completely gelatin-free, while retaining the desirable qualities of gelatin.

4 Claims, 1 Drawing Sheet

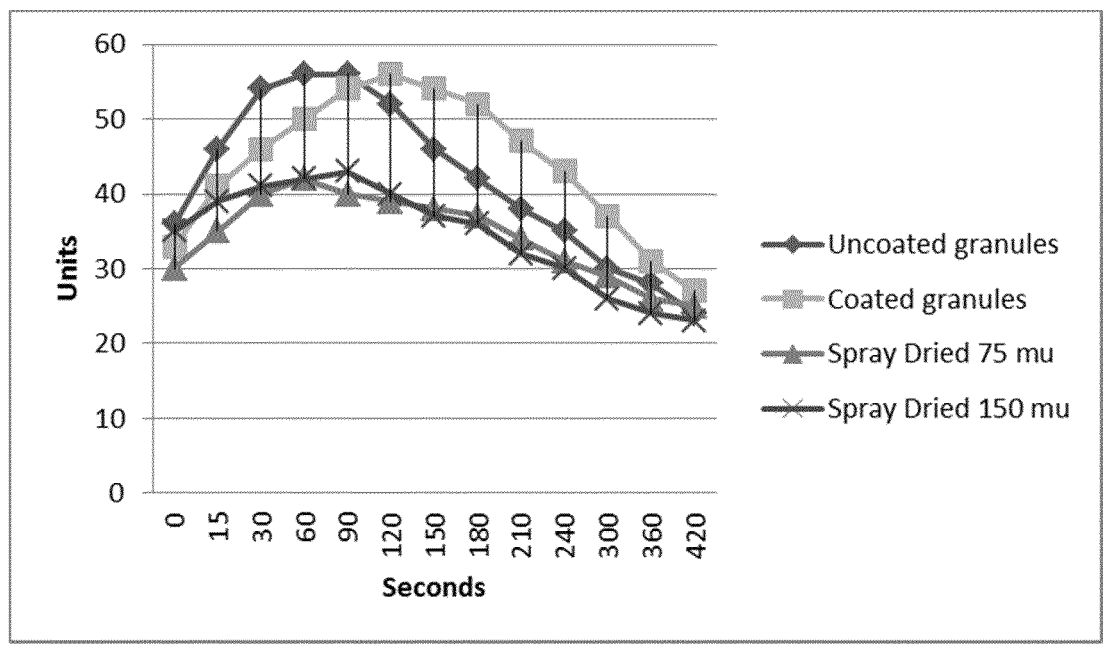

ENCAPSULATION

CROSS REFERENCE TO RELATED APPLICATIONS

This application is a national stage application of International Application No. PCT/EP2014/073186, filed 29 Oct. 2014, which claims priority from Great Britain Patent Application No. 1319192.9, filed 30 Oct. 2013, which applications are incorporated herein by reference.

This disclosure relates to flavour encapsulation.

The encapsulation of flavours is a very important technology, allowing, as it does, the preservation of flavour until its desired release time. This technology has found its way into a wide variety of consumable compositions, i.e., compositions taken orally, either for ingestion (such as foodstuffs, confectionery, baked goods and beverages) or for spitting out (such as toothpastes and mouthwashes).

One of the most common materials used for this application is gelatin. Gelatin has many advantages; it is cheap and readily available, it also has unique properties with respect to gelling and swelling behaviour, mouth-feel and specific melting behaviour in the mouth upon consumption. These have combined to make its use widespread.

Against these advantages, there have arisen numerous advantages. Gelatin is an animal product, thus meaning that it cannot be used in vegetarian products. In addition, depending on its source, it may involve religious prohibitions. It is hard to overcome kosher and halal prohibitions with gelatin products. However, finding a substitute for gelation that can give all its advantages without any of its disadvantages has proved difficult.

It has now been found that it is possible to provide the benefits of gelatin without the drawbacks. There is therefore provided an encapsulated flavour, comprising a core material, flavour material and a coating material, the core material comprising a finely-divided native starch, xanthan gum and konjac.

There is also provided a method of preparing an encapsulated flavour, comprising the blending of a mixture of native starch, xanthan gum and konjac and a flavour emulsion to give a granulate.

Native starches, i.e., non-chemically-modified starches, are well-known and readily-available items of commerce. Typical examples include rice and tapioca starch.

Xanthan gum is a well-known polysaccharide secreted by the bacterium Xanthomonas campestris, and it is widely used as a rheology modifier, thickener and stabiliser in foodstuffs and cosmetics.

Konjac is the root of an Asian plant Amorphophallus konjac. It is now widely used in health and dietary foods, because of its nutritional content and its high content of glucomannan fibre, which is noted for its swelling ability. It is available in powder (flour) and gel form. The powder form is preferred for use in this process.

Although all the materials are well known to the art, it is surprising to find that the combination may be used to replace gelatin and confer on the compositions the desirable qualities of gelatin.

FIG. 1 is a graph comparing release of the subject encapsulated granulate particles and conventional spray dried particles over time.

The flavour may be any suitable desired flavour. It is used in the form of an aqueous emulsion. In some cases, the flavour may be emulsified without the need for any emulsifiers, but in general the presence of at least some food-grade emulsifier is beneficial. Typical examples include gum Arabic, modified food starches and OSA starch.

In a particular embodiment, the emulsifier is derived from sorbitan. A particular embodiment is polyoxyethylene sorbitan monooleate, commercially available, for example, under the trade names Tween™, Polysorbate™ and Admul™. It has been surprisingly found that the use of these emulsifiers results in emulsifier flavour droplets of unusually small size (down to 1 micron), as opposed to the 3-4 micron size possible with other emulsifiers. The larger the droplets, the greater the flavour loss in the fluidised bed process, so a smaller size brings considerable advantages.

In a typical process, the core material is prepared by mixing the ingredients in a heated fluidised bed. The emulsion of the flavour is then sprayed on to the core material. Spraying is continued until a desired flavour content is attained. Typical fluidised bed equipment include Wurster, rotor granulator and top spray systems.

The fluidised bed equipment is operated according to the normal practices and within the recognised parameters of the art. Typical operating conditions are as follows:

Inlet temperature 60-110° C., particularly about 95° C.
Product Temperature 35-90° C., particularly about 65° C.
Air flow rate 20-140 $M^3$/h, particularly about 60 $M^3$/h
Nozzle air pressure 0.5-6 bar, particularly about 4 bar In a further embodiment, at least one protective layer may be applied to the granulate. A protective layer may be any food-grade material capable of forming a coating film, typical examples being cellulosic materials such as methyl and ethyl cellulose, and starch-based materials. This is sprayed as an aqueous solution on to the fluidised flavour granules.

The flavour granules hereinabove described may be used in all kinds of solid comestible products, that is, products taken by mouth either for ingestion or spitting out. There is therefore also provided a solid comestible composition comprising a comestible product base and encapsulated flavour as hereinabove defined.

By "solid" is meant a product that is not fluid, i.e., not a liquid or a spreadable paste. By "comestible product base" is meant all of the art-recognised ingredients that are combined with the encapsulated flavour to make a comestible product. These will depend on the nature of the particular product, but they include materials such as other flavours, binders and film-forming materials, thickeners, rheology modifiers, extenders and abrasive agents, solvents and diluents, pigments, dyestuffs and colouring matters, preservatives, flavour enhancers and modifiers, sweeteners, mouthfeel additives, antiseptics and medicinal compounds and compositions, and the like.

Non-limiting examples of comestible products include food products, oral care products, and compositions for admixture to such products, in particular flavour compositions. Flavour compositions may be added to processed foods during their processing, or they may actually be consumables in their own right, e.g. condiments such as sauces and the like.

Further non-limiting examples of comestible products include confectionery products such as chocolate and candy products, cereal products, baker's products, bread products, gums, chewing gums, yeast products, salt and spice products, mustard products, vinegar products, sauces (condiments), soups, processed foods, cooked fruits and vegetable products, meat and meat products, egg products, edible oils and fat products, medicaments, food extracts, plant extracts, meat extracts, condiments, sweeteners, nutraceuticals, pharmaceutical and non-pharmaceutical gums, tablets, lozenges and drops.

Use of the granules hereinabove described confer the possibility of having a gelatin-free product (thus meeting all the religious and dietary problems caused by the presence of gelation) with all the desirable qualities that the presence of gelatin brings. There is therefore also provided a gelatin-free solid comestible composition comprising a comestible product base and encapsulated flavour as hereinabove defined The disclosure is further described with reference to the following non-limiting examples.

EXAMPLE 1

Preparation of Particles
The ingredients are shown below:

| Material | Gram |
|---|---|
| A | |
| MD12[1] | 175 |
| Gum Arabic | 350 |
| Isomalt[2] | 175 |
| Water | 950 |
| Flavour[3] | 235 |
| Admul T60K[4] | 7 |
| B | |
| Tapioca grits | 150 |
| Xanthan | 50 |
| Konjac | 50 |
| C | |
| Methyl Cellulose | 50 |
| Water | 575 |

[1]Malto Dextrine (dextrose equivalent of 12)
[2]sugar alcohol
[3]Comercially-available peppermint flavour
[4]polyoxyethylene (20) sorbitan monooleate The process was carried out in a rotor granulator operating under the following conditions (with the usual slight practical variations):

| Inlet temperature | 100° C. |
|---|---|
| Product Temperature | 55° C. |
| Air flow | 70 m3/h |
| Nozzle air pressure | 1 bar |

Two batches of materials were prepared, the first utilising Stages A and B only ("uncoated granules"), the second additionally utilising C, in which a solution of methyl cellulose is sprayed on to the granules in the fluidised bed ("coated granules"). The same process conditions were maintained for both Stages B and C.

The two sets of granules were then collected and sieved to give granules of 500 µM maximum.

EXAMPLE 2

Testing of Granules.
Both sets of granules were incorporated at 2% by weight into the following chewing gum formulation:

| sorbitol | 56.3 |
|---|---|
| Solsona-T[1] | 30.0 |
| mannitol | 5.0 |
| Malitol syrup[2] | 8.0 |
| lecithin | 0.4 |
| Aspartame[2] | 0.2 |
| Acesulfame-K[2] | 0.1 |

[1]Commercially-available gum base
[2]Sweeteners

The granules were incorporated by using a Z-blade mixer at room temperature and kneading the mix of above ingredients until a homogeneous viscous mix (paste) was formed. The viscous paste was divided in chewing pellets of 1.2 gram each.

For comparison, there was added to the same chewing gum base in the same proportion conventional spray-dried starch flavour particles, carrying the same proportion of the same flavour as those prepared in Example 1. Two different sizes of spray-dried granules were used, of maximum sizes 150 and 75µm.

Evaluation was carried out by an expert panel of 15 members and the data statistically analysed by ANOVA. The results are shown in FIG. 1.

What can clearly be seen from the FIGURE is that
1. The uncoated granules made as hereinabove described have a rapid and very potent "up-front" release, corresponding to the immediacy of the flavour impact after commencement of chewing;
2. The coated granules have the same impact, but it is delayed by the extra coating.
3. Both substantially outperform the known spray-dried flavour granules.

The invention claimed is:
1. A gelatin-free encapsulated flavour, comprising flavour granules composed of a gelatin-replacer core material, flavour material on the core material and a coating material on the flavor granules, the gelatin-replacer core material comprising a finely-divided native starch, xanthan gum and konjac,
    wherein the coating material is selected from the group consisting of cellulosic materials and starch-based materials,
    and wherein the flavour material contains an emulsifier comprising polyoxyethylene sorbitan monooleate.
2. A solid comestible composition comprising a comestible product base and the encapsulated flavor according to claim 1.
3. The solid comestible composition according to claim 2, which is completely gelatin-free.

4. A method of preparing a gelatin-free encapsulated flavour, comprising
 (a) blending a mixture of finely-divided native starch, xanthan gum and konjac in a fluidised bed to prepare a gelatin-replacer core material; and
 (b) spraying a flavor emulsion comprising an emulsifier on to the gelatin-replacer core material to give fluidised flavor granules, wherein the emulsifier comprises polyoxyethylene sorbitan monooleate; and
 (c) spraying an aqueous solution of a food-grade coating material on to the fluidised flavor granules, wherein the coating material is selected from the group consisting of cellulosic materials and starch-based materials.

* * * * *